United States Patent
Kubo et al.

(10) Patent No.: US 8,951,600 B2
(45) Date of Patent: Feb. 10, 2015

(54) METHOD FOR PRODUCING ELECTRODE FOR SOLID BATTERY

(71) Applicants: Hiroki Kubo, Toyota (JP); Yuichi Hashimoto, Toyota (JP)

(72) Inventors: Hiroki Kubo, Toyota (JP); Yuichi Hashimoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/689,167

(22) Filed: Nov. 29, 2012

(65) Prior Publication Data
US 2013/0142943 A1 Jun. 6, 2013

(30) Foreign Application Priority Data

Dec. 5, 2011 (JP) ................. 2011-266035

(51) Int. Cl.
| B05D 5/12 | (2006.01) |
| H01M 4/1397 | (2010.01) |
| H01M 4/139 | (2010.01) |
| H01M 10/052 | (2010.01) |
| H01M 10/0562 | (2010.01) |

(52) U.S. Cl.
CPC ............ *H01M 4/1397* (2013.01); *Y02E 60/122* (2013.01); *H01M 10/052* (2013.01); *H01M 10/0562* (2013.01); *H01M 4/139* (2013.01)
USPC ......................................... 427/58; 427/126.1

(58) Field of Classification Search
USPC ........................................................... 427/58
See application file for complete search history.

(56) References Cited

U.S. PATENT DOCUMENTS

| 2005/0067949 A1* | 3/2005 | Natarajan et al. | 313/504 |
| 2006/0045959 A1* | 3/2006 | Yasukawa et al. | 427/66 |
| 2012/0216394 A1* | 8/2012 | Kitaura et al. | 29/623.2 |

FOREIGN PATENT DOCUMENTS

| JP | 11-086865 H | 3/1999 |
| JP | 2009-146657 A | 7/2009 |
| JP | 2010-033918 A | 2/2010 |
| JP | 2011-014387 A | 1/2011 |
| JP | 2011-060882 | 3/2011 |
| JP | 2011-134492 * | 7/2011 |
| JP | 2011-134492 A | 7/2011 |
| WO | WO 2011/052094 * | 5/2011 |
| WO | 2012128374 A1 | 9/2012 |

OTHER PUBLICATIONS

T. Inada, K. Takada, A. Kajiyama, H. Sasaki, S. Kondo, M. Watanabe, M. Murayama, R. Kanno, "Silicone as a binder in composite electrolytes", Journal of Power Sources, vol. 119-121 (2003) p. 948-950.

* cited by examiner

*Primary Examiner* — Austin Murata
(74) *Attorney, Agent, or Firm* — Gifford, Krass, Sprinkle, Anderson & Citkowski, P.C.

(57) ABSTRACT

The present invention provides a method for producing an electrode for a solid battery which can improve battery performance. The method for producing an electrode for a solid battery comprises the steps of: mixing an active material, a solid electrolyte, a binder, and a solvent to make a slurry-form electrode composition; applying the slurry-form electrode composition made; and drying the slurry-form electrode composition applied, wherein the solvent includes a good solvent for the binder and a poor solvent for the binder.

4 Claims, 3 Drawing Sheets

US 8,951,600 B2

METHOD FOR PRODUCING ELECTRODE FOR SOLID BATTERY

TECHNICAL FIELD

The present invention relates to a method for producing an electrode for a solid battery.

BACKGROUND ART

A lithium-ion secondary battery (hereinafter sometimes referred to as a "lithium battery") has characteristics that it has a higher energy density than other secondary batteries and is operable at a high voltage. Therefore, it is used in information devices such as cellular phones, as being a secondary battery which can be easily reduced in size and weight, and in recent years there have also been increasing demands of the lithium-ion secondary battery to be used as a power source for large-scale apparatuses such as electric vehicles and hybrid vehicles.

The lithium-ion secondary battery comprises: a cathode; an anode; and an electrolyte layer arranged therebetween. In general, an electrolyte to be used for the electrolyte layer is a nonaqueous liquid material or a solid material, for example. When the liquid electrolyte (hereinafter referred to as an "electrolytic solution") is used, it easily permeates into the cathode and the anode. Therefore, an interface can be easily formed between an active material contained in the cathode or the anode and the electrolytic solution, and the battery performance can be easily improved. However, since the electrolytic solution, which is widely used, is flammable, it is necessary to mount a system to ensure safety. On the other hand, using the electrolyte in solid form (hereinafter referred to as a "solid electrolyte"), which is nonflammable, makes it possible to simplify the above system. Therefore, development of a lithium-ion secondary battery provided with a layer containing the solid electrolyte has been promoted (hereinafter, the layer will be referred to as a "solid electrolyte layer", and the battery will be referred to as a "solid battery").

As a technique on such a lithium-ion secondary battery, Patent Document 1 for example discloses a manufacturing method of a lithium battery comprising the steps of: preparing an active material slurry by dispersing an active material in a solvent containing a lithium-ion conductive binder; preparing a solid electrolyte slurry by dispersing a sulfide-based solid electrolyte in a solvent containing a lithium-ion conductive binder; and forming an active material sheet and a solid electrolyte sheet by dripping the active material slurry and the solid electrolyte slurry, respectively, on a base material with side guards, adjusting the thickness of the slurry with a blade, and also heat-drying and peeling off the slurry. In addition, Patent Document 2 discloses a production method of a solid electrolyte layer comprising the steps of: preparing a slurry for forming a solid electrolyte layer, by mixing a sulfide solid electrolyte material with a dispersant made of at least one selected from tertiary amine, ether, thiol, ester having a functional group of a carbon number of three or more bonded to the carbon atom of the ester group and a functional group of a carbon number of four or more bonded to the oxygen atom of the ester group, and ester having a benzene ring bonded to the carbon atom of the ester group; making a coating film for forming a solid electrolyte layer by applying the slurry for forming a solid electrolyte layer onto a base material; and forming a solid electrolyte layer by drying the coating layer for forming a solid electrolyte layer. Furthermore, Non-Patent Document 1 mentions that after immersing a sulfide electrolyte in a solvent and examining the lithium-ion conductivity thereof and the reactivity thereof with the solvent, it was found that a solvent to be used in a wet process was limited to a non-polar solvent such as toluene and heptane.

CITATION LIST

Patent Literatures

Patent Document 1: Japanese Patent Application Laid-Open No. 2010-33918
Patent Document 2: Japanese Patent Application No. 2011-60882

Non-Patent Literatures

Non-Patent Document 1: T. Inada, K. Takada, A. Kajiyama, H. Sasaki, S. Kondo, M. Watanabe, M. Murayama, R. Kanno, Journal of Power Sources, Vol. 119-121, p. 948-950, (2003)

SUMMARY OF INVENTION

Problem to be Solved by Invention

In the technique disclosed in Patent Document 1, the active material slurry and the solid electrolyte slurry are prepared first and thereafter the active material sheet and the solid electrolyte sheet are formed, respectively. Therefore, the surfaces of the active material and the solid electrolyte are covered with the binder, and as a result the battery performance tends to degrade. This problem is difficult to solve even if the technique disclosed in Patent Document 1 and the technique disclosed in Non-Patent Document 1 are combined.

Accordingly, an object of the present invention is to provide a method for producing an electrode for a solid battery which can improve battery performance.

Solution to Problem

The inventors have found, as a result of their intensive study, that it is possible to improve performance of a solid battery by producing an electrode (cathode and anode) through the process of: using a good solvent for a binder and a poor solvent for the binder in making a slurry-form electrode composition containing an active material (cathode active material and anode active material), a solid electrolyte, and the binder; and applying and drying the slurry-form electrode composition that has been made. The present invention has been completed based on this finding.

The present invention takes the following means in order to solve the above problem.

The present invention is a method for producing an electrode for a solid battery comprising the steps of: mixing an active material, a solid electrolyte, a binder, and a solvent to make a slurry-form electrode composition; applying the slurry-form electrode composition that has been made; and drying the slurry-form electrode composition that has been applied, wherein the solvent includes a good solvent for the binder and a poor solvent for the binder.

Herein, the "active material" refers to an anode active material in a case of producing an anode of a solid battery by the present invention, whereas it refers to a cathode active material in a case of producing a cathode of a solid battery by the present invention. In addition, the "good solvent for the binder" refers to a solvent in which the solubility of the binder is 5% or more, whereas the "poor solvent for the binder" refers to a solvent in which the solubility of the binder is less than 0.1%.

In the present invention, a good solvent for the binder and a poor solvent for the binder are used to produce an electrode for a solid battery. Therefore, the binder can be deposited in a point-like or linear manner between the particles (between the active materials, between the solid electrolytes, or between the active material and the solid electrolyte. The same shall apply hereinafter.). With the binder deposited in this manner, it is possible to reduce the ion conduction resistance or the electron conduction resistance, compared to the conventional technique in which a surface of an active material or a solid electrolyte is covered with a binder. As such, using an electrode produced by the present invention enables improvement of performance of a solid battery.

Further in the above present invention, the good solvent preferably has a boiling point lower than that of the poor solvent. With this configuration, the good solvent can be dried first in the drying step so that the poor solvent can remain, therefore enabling the binder to be easily deposited between the particles in a point-like or linear manner.

Furthermore in the above present invention, the active material may be a cathode active material; a binder having an amine group introduced into the terminal of hydrogenated butadiene rubber may be employed as the binder; heptane may be employed as the good solvent; and n-butyl n-butyrate or anisole may be employed as the poor solvent. With this configuration as well, it is possible to produce an electrode (cathode) for a solid battery which can improve performance of the solid battery.

Additionally in the above present invention, the active material may be an anode active material; a binder having an amine group introduced into the terminal of hydrogenated butadiene rubber may be employed as the binder; heptane may be employed as the good solvent; and anisole may be employed as the poor solvent. With this configuration as well, it is possible to produce an electrode (anode) for a solid battery which can improve performance of the solid battery.

Moreover in the above present invention, the solid electrolyte is preferably a sulfide solid electrolyte. With this configuration, it is possible to produce an electrode for a solid battery which easily improves performance of the solid battery.

Advantageous Effects of Invention

According to the present invention, it is possible to provide a method for producing an electrode for a solid battery which can improve battery performance.

BRIEF DESCRIPTION OF DRAWINGS

FIG. 2 is a view illustrating a configuration of an active material, a solid electrolyte, and a binder.

MODES FOR CARRYING OUT THE INVENTION

Hereinafter, the present invention will be described with reference to the drawings. Some of the repeating numerals may be omitted below. It should be noted that the embodiment shown below is an example of the present invention and that the present invention is not limited to the embodiment.

Figure 1:
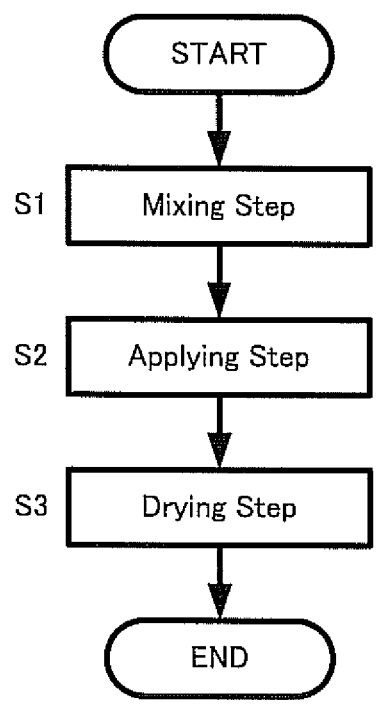
FIG. 1 is a view describing the method for producing an electrode for a solid battery of the present invention.

FIG. 1 is a view describing the method for producing an electrode for a solid battery of the present invention. As shown in FIG. 1, the present invention comprises a mixing step (S1), an applying step (S2), and a drying step (S3).

In the mixing step (hereinafter sometimes referred to as "S1") is a step of mixing an active material, a solid electrolyte, a binder, a good solvent for the binder, and a poor solvent for the binder, to make a slurry-form electrode composition. In a case of producing an anode for a solid battery by the present invention, an anode active material may be used as the active material. In a case of producing a cathode for a solid battery by the present invention, a cathode active material may be used as the active material.

The applying step (hereinafter sometimes referred to as "S2") is a step of applying the slurry-form electrode composition that has been made in S1, onto a base material (for example, a cathode current collector or an anode current collector).

Figure 2A:
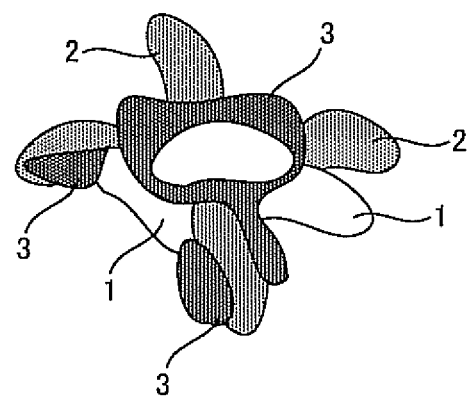
FIG. 2A shows a configuration of a slurry-form electrode composition made by using a good solvent for a binder.
Figure 2B:
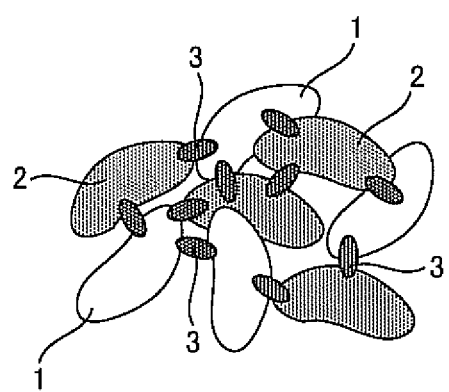
FIG. 2B shows a configuration of a slurry-form electrode composition made by using a good solvent for a binder and a poor solvent for the binder.

The drying step (hereinafter sometimes referred to as "S3") is a step of drying the slurry-form electrode composition that has been applied in S2. FIG. 2 is a view illustrating a configuration of the active material, the solid electrolyte, and the binder. FIG. 2A shows a configuration of a slurry-form electrode composition made by using a good solvent for the binder but not using a poor solvent for the binder. FIG. 2B shows a configuration of the slurry-form electrode composition made in S1. As shown in FIG. 2A, when a slurry-form electrode composition is made by using a good solvent for the binder but not using a poor solvent for the binder, a surface of active materials 1, 1, ... or solid electrolytes 2, 2, ... and a surface of a binder 3, 3, ... contact with each other, thus leading to great obstruction to movement of the ions or electrons by the binder 3. On the other hand, a good solvent for the binder is used in the slurry-form electrode composition made in S1. Therefore, the active materials 1, 1, ..., the solid electrolytes 2, 2, ... and the binders 3, 3, ... can be uniformly dispersed therein. In addition, a poor solvent for the binder is used therein. Therefore, as shown in FIG. 2B, the active materials 1, 1, ... or the solid electrolytes 2, 2, ... can be contacted with the binders 3, 3, ... in a point-like or linear manner. As a result, the ions or electrons can move with little effect by the binder.

In the present invention comprising S1 to S3, not only a good solvent for the binder but also a poor solvent for the binder are used to produce an electrode for a solid battery. Therefore, the binder can be deposited between the particles in a point-like or linear manner. By depositing the binder in this manner, it is possible to arrange the binder only on a part of the surface of the active material and the solid electrolyte included in the electrode, and to prevent the entire surface of the active material and the solid electrolyte from being covered with the binder. With the configuration shown in FIG. 2B, in which a part of the surface of the active material and the solid electrolyte included in the electrode is exposed, it is possible to easily reduce the ion conduction resistance or the electron conduction resistance, compared to the configuration shown in FIG. 2A, in which the entire surface of the active material or the solid electrolyte is covered with the binder. As such, it is possible, through S1 to S3, to produce an electrode for a solid battery which can improve performance of the solid battery.

In the present invention, as long as a good solvent for the binder and a poor solvent for the binder are used, the configuration thereof is not particularly limited. However, in order to easily deposit the binder between the particles in a point-like or linear manner in the drying step to thereby easily produce an electrode for a solid battery which can improve performance of the solid battery, it is preferable to use a poor solvent and a good solvent which has a vapor pressure higher than that of the poor solvent and has a boiling point lower than that of the poor solvent.

Figure 3:
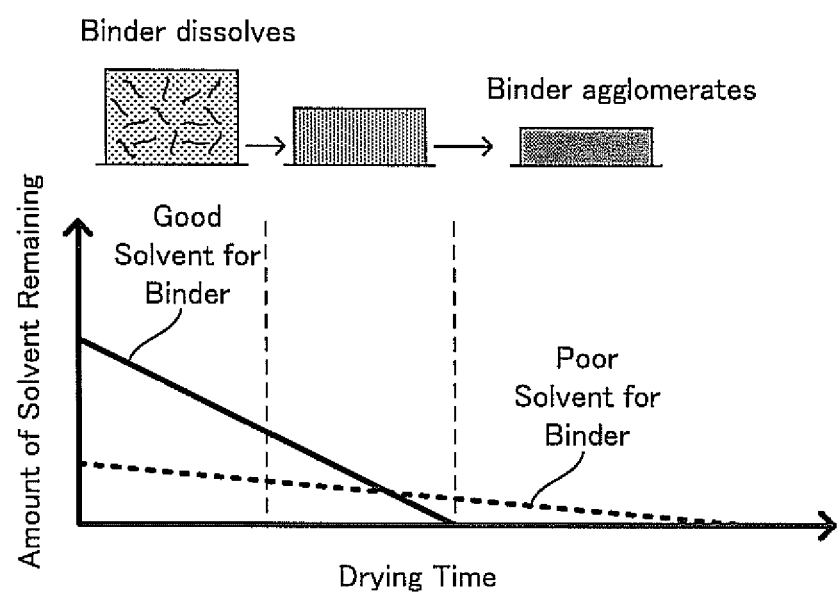
FIG. 3 is a view illustrating a drying step.

FIG. 3 is a view illustrating the drying step in the case of using a poor solvent for the binder and a good solvent for the binder which has a vapor pressure higher than that of the poor solvent and has a boiling point lower than that of the poor solvent. FIG. 3 shows a relation between the amount of the solvent remaining and the drying time, and changes in the electrode with time. As shown in FIG. 3, when a poor solvent for the binder and a good solvent for the binder which has a vapor pressure higher than that of the poor solvent and has a boiling point lower than that of the poor solvent are used, a large amount of the good solvent for the binder remains without evaporating at the beginning of drying, and therefore the binder is dissolved in the slurry-form electrode composition. Thereafter, much of the good solvent for the binder evaporates with time; and it is the poor solvent for the binder that remains in the slurry-form electrode composition during the time from when the good solvent for the binder has evaporated to when the poor solvent for the binder completes evaporating. The binder easily dissolves in a good solvent for the binder, whereas it has difficulty in dissolving in a poor solvent for the binder. Therefore, after the good solvent for the binder has evaporated, the binder can be easily deposited in the slurry-form electrode composition and can be easily deposited between the particles in a point-like or linear manner. As such, with the good solvent having a vapor pressure higher than that of the poor solvent and having a boiling point lower than that of the poor solvent, it is possible to easily produce an electrode for a solid battery which can improve performance of the solid battery.

When producing a cathode for a solid battery by the present invention, a cathode active material usable in a solid battery may be adequately employed for the active material. Examples of such a cathode active material include: layered active materials such as lithium cobalt oxide ($LiCoO_2$) and lithium nickel oxide ($LiNiO_2$); olivine-type active materials such as olivine-type lithium iron phosphate ($LiFePO_4$); spinel-type active materials such as spinel-type lithium manganese oxide ($LiMn_2O_4$). The cathode active material may be in a particulate form or in a thin-film form, for example. The average particle size (D50) of the cathode active material is preferably 1 nm or more and 100 μm or less for example, and more preferably 10 nm or more and 30 μm or less. Further, the content of the cathode active material in the cathode is not particularly limited, but it is preferably 20% or more and 90% or less by mass.

In order to easily prevent increase in the battery resistance by preventing formation of a high-resistant layer at an interface between the cathode active material and the solid electrolyte, it is preferable for the cathode active material to be coated with an ion-conductive oxide. An example of a lithium-ion-conductive oxide to coat the cathode active material may be an oxide which can be represented by a general formula $Li_xAO_y$ (A being B, C, Al, Si, P, S, Ti, Zr, Nb, Mo, Ta, or W; x and y being a positive number). Specific examples thereof include $Li_3BO_3$, $LiBO_2$, $Li_2Co_3$, $LiAlO_2$, $Li_4SiO_4$, $Li_2SiO_3$, $Li_3PO_4$, $Li_2SO_4$, $LiTiO_3$, $Li_4Ti_5O_{12}$, $Li_2Ti_2O_5$, $Li_2ZrO_3$, $LiNbO_3$, $Li_2MoO_4$, and $Li_2WO_4$. Further, the lithium-ion-conductive oxide may be a composite oxide. As an example of the composite oxide to coat the cathode active material, the above lithium-ion-conductive oxide may be adequately combined, for example $Li_4SiO_4$—$Li_3BO_3$ and $Li_4SiO_4$—$Li_3PO_4$. Furthermore, in the case of coating a surface of the cathode active material with the ion-conductive oxide, at least a part of the cathode active material may be coated with the ion-conductive oxide; or the entire surface of the cathode active material may be coated with the ion-conductive oxide as well. In addition, the thickness of the ion-conductive oxide to coat the cathode active material is preferably 0.1 nm or more and 100 nm or less for example, and more preferably 1 nm or more and 20 nm or less. The thickness of the ion-conductive oxide can be measured using a transmission electron microscope (TEM) or some other means.

In addition, when producing an anode for a solid battery by the present invention, an anode active material usable in a solid battery may be adequately employed for the active material. Examples of such an anode active material include: carbon active materials, oxide active materials, and metal active materials. The carbon active material is not particularly limited as long as it contains carbon. It may be mesocarbon microbeads (MCMB), highly-oriented graphite (HOPG), hard carbon, or soft carbon, for example. Examples of the oxide active material include $Nb_2O_5$, $Li_4Ti_5O_{12}$, and SiO. Examples of the metal active material include In, Al, Si, and Sn. Further, a metal active material containing lithium may be employed as the anode active material. The metal active material containing lithium is not particularly limited as long as it contains at least Li: it may be Li metal; it may also be a Li alloy. An example of the Li alloy may be an alloy containing Li and at least one selected from In, Al, Si, and Sn. The anode active material may be in a particulate form or in a thin-film form, for example. The average particle size (D50) of the anode active material is preferably 1 nm or more and 100 μm or less for example, and more preferably 10 nm or more and 30 μm or less. Further, the content of the anode active material in the anode is not particularly limited, but it is preferably 20% or more and 99% or less by mass.

As for the solid electrolyte in the present invention, a known solid electrolyte usable in a solid battery may be adequately employed. Examples of such a solid electrolyte include: an amorphous oxide solid electrolyte such as $Li_2O$—$B_2O_3$—$P_2O_5$, $Li_2O$—$SiO_2$; an amorphous sulfide solid electrolyte such as $Li_2S$—$SiS_2$, LiI—$Li_2S$—$SiS_2$, LiI—$Li_2S$—$P_2O_5$, LiI—$Li_3PO_4$—$P_2S_5$, $Li_2S$—$P_2S_5$, $Li_3PS_4$; LiI, $Li_3N$; or crystalline oxide and oxynitride such as $Li_5La_3Ta_2O_{12}$, $Li_7La_3Zr_2O_{12}$, $Li_6BaLa_2Ta_2O_{12}$, $Li_3PO_{(4-3/2w)}N_w$ (w being w<1), $Li_{3.6}Si_{0.6}P_{0.4}O_4$. However, in order to be able to produce an electrode for a solid battery which can easily improve performance of the solid battery, it is preferable to employ the sulfide solid electrolyte.

Also for the binder in the present invention, a known binder usable in a cathode or in an anode of a solid battery may be adequately employed. Examples of such a binder include acrylonitrile-butadiene rubber (ABR), butadiene rubber (BR), polyvinylidene fluoride (PVDF), fluoride-containing rubber, and styrene-butadiene rubber (SBR). However, in view of the reactivity with an electrolyte, it is preferable to employ butadiene rubber hydrogenated to remove most of the double bonds, and more preferable to employ a binder having a functional group introduced.

As for the solvent in the present invention, a good solvent for the binder and a poor solvent for the binder are employed, which do not react with the solid electrolyte. A known organic solvent may be adequately employed for such a solvent. A solvent having a solubility of about 0.1 weight % or more and less than 2 weight %, relative to the good solvent for a binder, may be employed as the poor solvent for the binder. In view of deterioration of the electrolyte, the moisture content of the good solvent for the binder and the poor solvent for the binder is preferably 100 ppm or less in the present invention.

Furthermore in the present invention, a conductive material to improve conductivity may be mixed in together with the active material, the solid electrolyte, the binder, and the solvent, to make a slurry-form electrode composition; and this slurry-form electrode composition may be used to produce an electrode. Examples of the conductive material usable in the present invention include not only carbon materials such as vapor-grown carbon fiber, acetylene black (AB), ketjen black (KB), carbon nanotube (CNT), and carbon nanofiber (CNF), but also a metal material that can endure the environment in which the solid battery is used.

As described above, the applying step in the present invention may be a step in which the slurry-form electrode composition is applied onto a cathode current collector or an anode current collector. In the present invention, a cathode current collector and an anode current collector usable as a current collector of a solid battery may be adequately employed. Such a cathode current collector and an anode current collector may be constituted by a metal material including one or more elements selected from a group consisting of Cu, Ni, Al, V, Au, Pt, Mg, Fe, Ti, Co, Cr, Zn, Ge, and In. The cathode current collector and the anode current collector may be in a foil-shaped, for example. In manufacturing a solid battery comprising the electrode for a solid battery produced by the present invention, a slurry-form cathode composition made in S1 using a cathode active material is applied over a surface of the cathode current collector in S2, and through the drying step S3 a cathode structure having the cathode current collector and the cathode is produced, for example. In addition, a slurry-form anode composition made in S1 using an anode active material is applied over a surface of an anode current collector in S2, and through the drying step S3 an anode structure having the anode current collector and the anode is produced. Then, a solid electrolyte layer is formed through the step of applying a slurry-form electrolyte composition containing a solid electrolyte over the surface of the cathode or anode; they are stacked such that the solid electrolyte layer is sandwiched by the cathode and the anode; and thereafter a process is carried out such as pressing the resultant at a predetermined pressure (for example around 400 MPa) and sealing it with an exterior body under reduced pressure. Thereby, a solid battery can be manufactured.

In the above descriptions of the present invention, the configuration of producing an electrode for a lithium-ion secondary battery of the present invention has been introduced as an example. However, the present invention is not limited to this configuration. The present invention may be adopted in producing an electrode of a battery in which ions other than lithium ions move. Examples of the ions other than lithium ions include sodium ions and potassium ions. When a battery has a configuration that ions other than lithium ions move, the cathode active material, the solid electrolyte, and the anode active material may be adequately selected depending the ions to move.

EXAMPLES

Hereinafter, the present invention will be described more in detail with Examples and Comparative Examples.

(1) Manufacturing of a Solid Battery

Example 1

Production of a Cathode Structure

An active material (Li $(NiMnCo)_{1/3}O_2$, produced by NICHIA CORPORATION) and a sulfide solid electrolyte ($LiI—LiO_2—Li_2S—P_2S_5$, Toyota Jidosha Kabushiki Kaisha's own synthetic product) were weighed such that the weight ratio thereof becomes "active material:sulfide solid electrolyte=75:25". A binder (a binder having an amine group introduced into the terminal of hydrogenated butadiene rubber, produced by JSR Corporation) and a conductive additive (vapor-grown carbon fiber, produced by SHOWA DENKO) were weighed so as to obtain 1.5 parts of the binder relative to 100 parts of the active material, and 3.0 parts of the conductive additive relative to 100 parts of the active material. Further, a prime solvent (heptane (dehydration grade), produced by NACALAI TESQUE, INC.) and a secondary solvent (n-Butyl n-Butyrate, produced by Tokyo Chemical Industry Co., Ltd.) dehydrated with a molecular sieve were mixed such that the weight ratio thereof was "prime solvent:secondary solvent=80:20". These were prepared such that the solid content rate was 63 weight % and mixed well for one minute using an ultrasonic homogenizer (UH-50, manufactured by SMT CO., LTD.), to produce a slurry-form cathode composition. Then, the slurry-form cathode composition was applied over a surface of an aluminum foil coated with carbon (SDX, produced by SHOWA DENKO K.K., "SDX" being a registered trademark of Showa Denko Packaging Co., Ltd.), using an applicator (350 μm gap, manufactured by Taiyu Kizai Co., Ltd.); and was let to dry naturally for 30 minutes. Thereafter it was heat-dried at 100° C. for 30 minutes to form a cathode. Thereby, a cathode structure having the cathode current collector and the cathode was produced.

Production of an Anode Structure

An active material (MF-6, produced by Mitsubishi Chemical Corporation) and a sulfide solid electrolyte ($LiI—LiO_2—Li_2S—P_2S_5$, Toyota Jidosha Kabushiki Kaisha's own synthetic product) were weighed such that the weight ratio thereof was "active material:sulfide solid electrolyte=58:42". A binder (a binder having an amine group introduced into the terminal of hydrogenated butadiene rubber, produced by JSR Corporation) was weighed so as to obtain 1.1 parts of thereof relative to 100 parts of the active material. Further, a prime solvent (heptane (dehydration grade), produced by NACALAI TESQUE, INC.) and a secondary solvent (tri-n-butylamine, produced by Tokyo Chemical Industry Co., Ltd.) dehydrated with a molecular sieve were mixed such that the weight ratio thereof was "prime solvent:secondary solvent=82:18". These were prepared such that the solid content rate was 63 weight % and mixed well for one minute using an ultrasonic homogenizer (UH-50, manufactured by SMT CO., LTD.), to produce a slurry-form anode composition. Then, the slurry-form anode composition was applied over a surface of an anode current collector (copper foil), using an applicator (350 μm gap, manufactured by Taiyu Kizai Co., Ltd.); and was let to dry naturally for 30 minutes. Thereafter it was heat-dried at 100° C. for 30 minutes to form an anode. Thereby, an anode structure having the anode current collector and the anode was produced.

Manufacturing of a Solid Battery

The cathode structure, the sulfide solid electrolyte, and the anode structure were stacked with one another in a manner that the sulfide solid electrolyte was disposed between the cathode of the cathode structure and the anode of the anode structure. Thereby a solid battery was produced.

Example 2

A solid battery according to Example 2 was produced in the same conditions as in Example 1 above, except that anisole dehydrated by a molecular sieve (produced by Tokyo Chemical Industry Co., Ltd.) was used as a secondary solvent in forming a cathode.

Comparative Example 1

A solid battery according to Comparative Example 1 was produced in the same conditions as in Example 1 above, except that a secondary solvent was not used and hydrogenated butadiene rubber was used as a binder in forming a cathode and an anode.

(2) Evaluation of the Condition of the Applied Surface

The conditions of the surface that had been applied with the slurry-form cathode composition were evaluated for Example 1, Example 2, and Comparative Example 1, respectively. The results are shown in Table 1. In Table 1, "O" denotes that the number of point-like protrusions generated was not more than 5 and that the film thickness distribution was within ±5%. In Table 1, "x" denotes that the conditions for "O" were not met.

(3) Evaluation of the Battery Performance

The discharge/charge capacity, and the output of each of the solid batteries of Example 1, Example 2, and Comparative Example 1 were examined in the same conditions. Table 1 shows the results of the discharge/charge capacity and the output thereof, with the discharge/charge capacity of the solid battery of Comparative Example 1 as 100 and the output of the solid battery of Comparative Example 1 as 100.

TABLE 1

|  | Condition of Applied Surface | Discharge/Charge Capacity | Output |
| --- | --- | --- | --- |
| Example 1 | o | 113 | 102 |
| Example 2 | o | 113 | 122 |
| Comparative Example 1 | x | 100 | 100 |

(4) Results

It was found from Table 1 that: the discharge/charge capacity of the solid batteries according to Examples 1 and 2 was larger than that of the solid battery according to Comparative Example 1 by approximately 10%; and the discharge/charge capacity of the solid battery according to Example 1 and that of the solid battery according to Example 2 were the same. In addition, the output of the solid battery according to Example 2 was larger than that of the solid battery according to Comparative Example by approximately 20%. The solid battery according to Comparative Example 1, in which a secondary solvent was not used, exhibited a discharge/charge capacity and an output which were smaller than those of the solid batteries according to Examples 1 and 2.

It is understood from above that according to the present invention a method for producing an electrode for a solid battery which can improve battery performance can be provided.

DESCRIPTION OF REFERENCE NUMERALS

1 active material
2 solid electrolyte
3 binder

The invention claimed is:

1. A method for producing an electrode for a solid battery comprising the steps of:
   mixing an active material, a solid electrolyte, a binder, and a solvent to make a slurry-form electrode composition;
   applying the slurry-form electrode composition that has been made; and
   drying the slurry-form electrode composition that has been applied,
   wherein the solvent includes a good solvent for the binder and a poor solvent for the binder,
   wherein the good solvent defines a solubility for the binder of 5% or more and the poor solvent defines a solubility for the binder of less than 0.1%, and
   wherein the poor solvent is selected from a group consisting
   of n-Butyl n-Butyrate and anisole.

2. The method for producing said electrode for the solid battery according to claim 1, wherein the good solvent has a boiling point lower than that of the poor solvent.

3. The method for producing said electrode for the solid battery according to claim 2, wherein the solid electrolyte is a sulfide solid electrolyte.

4. The method for producing an electrode for a solid battery according to claim 1, wherein the solid electrolyte is a sulfide solid electrolyte.

\* \* \* \* \*

UNITED STATES PATENT AND TRADEMARK OFFICE
CERTIFICATE OF CORRECTION

PATENT NO. : 8,951,600 B2
APPLICATION NO. : 13/689167
DATED : February 10, 2015
INVENTOR(S) : Hiroki Kubo It is certified that error appears in the above-identified patent and that said Letters Patent is hereby corrected as shown below:

IN THE CLAIMS

In Column 10, Line 45, Claim 4 after "producing" delete "an" and insert -- said --, therefor.

In Column 10, Line 45, Claim 4 after "for" delete "a" and insert -- the --, therefor.

Signed and Sealed this
Sixteenth Day of February, 2016

Michelle K. Lee
*Director of the United States Patent and Trademark Office*